Nov. 27, 1951     J. BERGMANS ET AL     2,576,875
SEARCHLIGHT
Filed Aug. 9, 1947                                2 SHEETS—SHEET 2
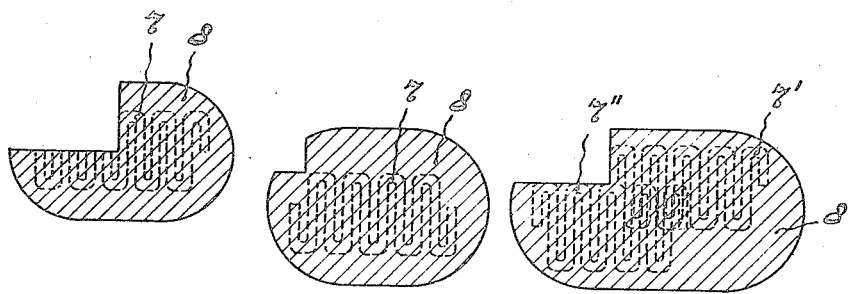
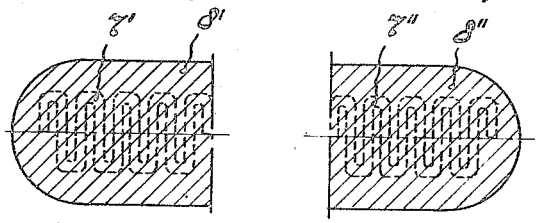
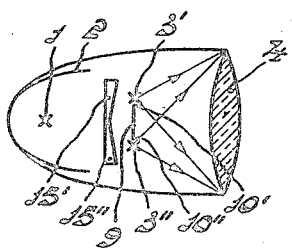
INVENTOR
JAN BERGMANS
DIRK VERMEULEN
BY
AGENT Patented Nov. 27, 1951

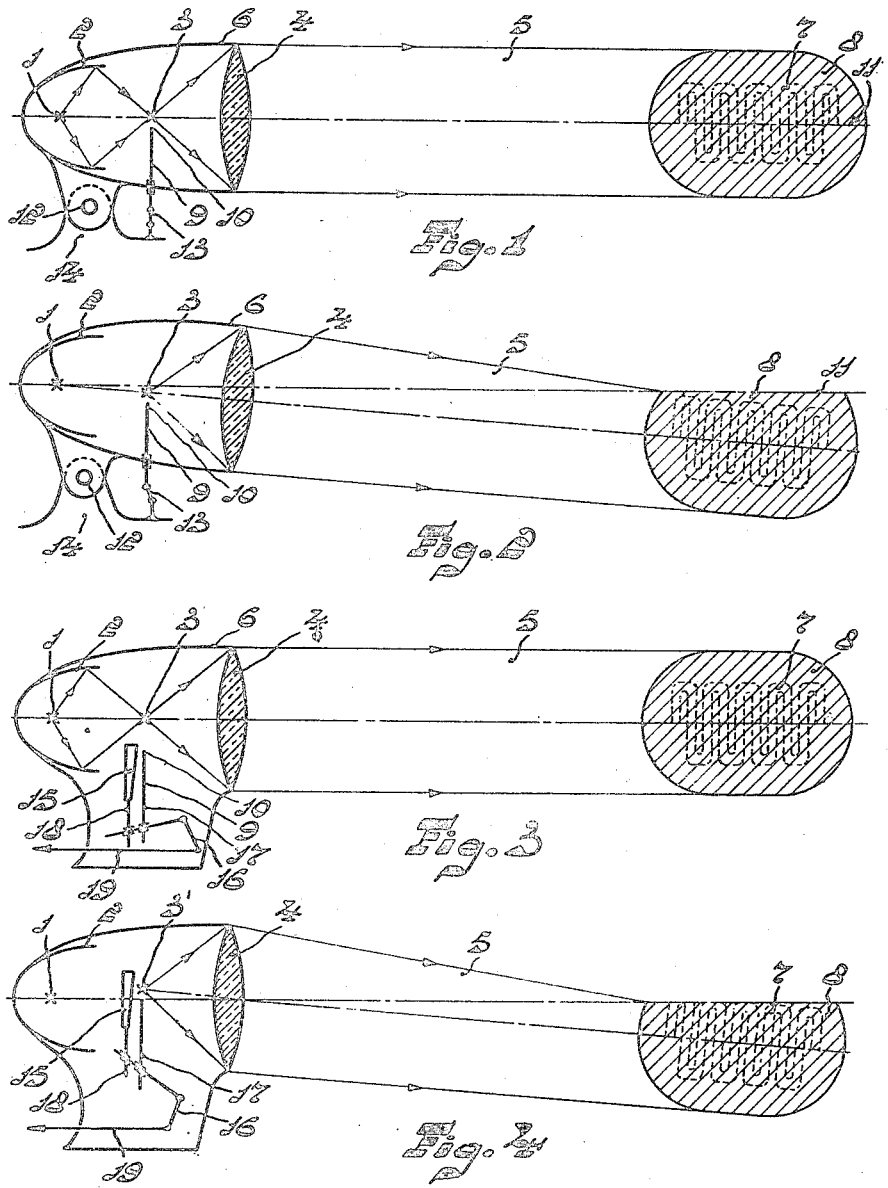

2,576,875

UNITED STATES PATENT OFFICE 2,576,875

SEARCHLIGHT

Jan Bergmans and Dirk Vermeulen, Eindhoven, Netherlands, assignors to Hartford National Bank and Trust Company, Hartford, Conn., as trustee Application August 9, 1947, Serial No. 767,691
In the Netherlands August 27, 1946

5 Claims. (Cl. 240—41.3)

1

When using searchlights, for example motor-car lights, it is frequently desirable to enable a sharp boundary to be traced between a lighted and a non-lighted field. Thus, when using searchlights on a motor-car, this is required to prevent vehicles coming from the opposite side from being dazzled.

It is already known to build up a searchlight from a light source and an optical system, in which one part of this system produces at least one real image of the light source in the focal plane of the other part of the system, which other part forms a beam of the light radiated by the real image, the edge of a movable screen being adapted to be displaced in the focal plane.

In this device the edge of the screen is moved into the real image in the case of dimming, so that the screen and part of the image are projected in the infinite. Since the edge forms a sharp boundary of the image, the separation between light and dark in the projection, i. e. on the lighted road is very sharply defined.

However, these known devices have two disadvantages. For the use concerned it is in general required that, upon dimming, part of the field initially lighted should no longer be illuminated. This was achieved by removing part of the real image of the light source by means of the screen which results in a considerable loss of light. Furthermore, upon dimming, the said device does not permit of directing an additional quantity of light to the field which remains lighted, for example the field just in front of the vehicle.

The searchlight according to the invention does not exhibit these disadvantages.

According to the invention the screen is coupled to a device which, when the edge of the screen is moved, at least partly deflects the beam in a direction remote from the intercepted part of the beam.

The invention will now be explained more fully with reference to the accompanying drawing, which illustrates, by way of example, some embodiments thereof.

Figs. 1, 3 and 2, 4 respectively are vertical meridian-sectional views of two searchlights according to the invention in the undimmed and dimmed position respectively. In the searchlight shown in Figs. 1 and 2 the beam is deflected by displacement of the whole of the optical system. In the searchlight shown in Figs. 3 and 4 this is effected by means of a prism.

The right-hand parts of Figs. 1 to 4 and those of Figs. 5 to 8 show the forms of the beams which can be produced by these searchlights. Such a form of beam diagrammatically illustrates the lighting of a surface placed at right angles to the beam at some distance from the searchlight.

Fig. 9 is a horizontal sectional view of a further form of searchlight.

The searchlight shown in Figs. 1 and 2 comprises a light source 1 housed in a reflector 2 which has the shape of an ellipsoid of revolution. This reflector forms an image of the light source at 3 in the focal plane of a lens 4 by which the light is formed into a beam 5. The reflector 2 and the lens 4 jointly constitute the optical system of the searchlight and are supported by a housing 6.

Fig. 1 shows a searchlight in the undimmed position. The beam 5 extends substantially horizontally. The lighting is obtained by a greatly enlarged image 7 (see the beam shape in the right-hand part of the figure) of the light source, in the present case of the helical filament of an electric lamp. This image forms, together with the stray light, a luminous spot 8.

If the lamp should serve for road lighting, for example, with a motor-car, it is necessary that, in the case of traffic coming from the opposite side, all light should be removed up to a definite limit, for example above a definite height.

This is effected in this case by means of a screen 9, which is arranged in the focal plane of lens 4. When the edge 10 of this screen is shifted upwards, this edge as well as the rest of the screen are projected by lens 4 in form of a dark spot which sharply defines the light spot 8 at 11 (see the right-hand part of Fig. 2).

If the beam were maintained in the horizontal position as shown in Fig. 1, the boundary 11 of Fig. 2 would be required to extend centrally through the image 4, as indicated by 11' in Fig. 1, in order to avoid dazzling of other users of the road. Thus, a large proportion of the light-flux would be lost.

This loss of light is avoided owing to screen 9 being coupled to a device which deflects the beam in downward direction upon the edge 10 of the screen being moved towards the image 3 of the light source. Thus the upper part of the beam is intercepted by the screen.

It is thus possible to position the boundary 11 in the light spot in such manner that only part of the stray light is removed, the beam otherwise being being used for lighting of the road quite near the vehicle. This is clearly shown by the right-hand half of Fig. 2.

The device effecting the said coupling in this case comprises a support, i. e. a pivot 12 on which the housing 6 hinges, and a coupling device, i. e. a rod 13, between the screen and the fixed part 14 of the support. It is thus ensured in a very simple and little expensive manner, that, while the searchlight is caused to incline forward and the beam 5 is lowered, the screen 9 in the lamp rises to a correspondingly higher position and intercepts the beam 5 at the upper side. The rod 13 is pivoted to screen 9 and to the fixed part 14, so that torsion of the various parts is avoided.

Figs. 3 and 4 show a further embodiment. As before, a reflector 2 shaped in the form of an ellipsoid of revolution produces an image 3 of the light source 1 in the focal plane of lens 4. The edge 10 of screen 9 is here also adapted to be positioned in the focal plane. In this case the screen is connected to a prism 15 by which the rays emanating from the light source 1 are deflected in such manner that the image of the light source now occupies the raised position 3' (see Fig. 4). The beam 5 is thus deflected downwards.

The device which deflects the beam upon the edge of the screen being moved towards the image of the light source comprises in this case the prism 15 which is movably arranged in such manner that it permits of being moved into or out of the flux of the light source and the mechanical coupling between prism and screen, the arrangement being such that upon the edge of the screen being moved towards the real image of the light source, the prism projects a new real image which is shifted with respect to the initial image. This mechanical coupling comprises a pivotally arranged lever 16 which is articulated to rods 17 and 18 which serve to support the screen and the prism. The lever may be operated by a cable 19.

In the two embodiments given by way of example a reflector 3 shaped in the form of an ellipsoid of revolution is chosen as an example of that part of the optical system which produces an image of the light source. As a matter of course any optical system capable of producing a real image of the light source is serviceable, for example also a lens. In either case a lens 4 is chosen to constitute the other part of the optical system. As an alternative, for this a reflector might be substituted, for example, a reflector shaped in the form of a paraboloid.

The parts of the optical system may be formed in a shape such that the image of the light source is as sharply defined as is possible with practical means but they may also be so constructed as to produce some stray of the light, for example, by slightly frosting of their active surfaces or providing configurations thereon. However, more particularly in constructing the part of the system producing the beam, in the present case the lens 4, it is desirable that this stray should be restricted since it might at the same time lead to a less sharp projection of the edge 10 of screen 9. This part of the system is allowed to produce local deformations in the projection of the real image of the light source and of the edge of the screen, but it must not disturb the sharp transition between the lighted and non-lighted fields.

The screen 9 may be completely opaque but it may alternatively be made transparent, colored or from polarising material.

In the two embodiments given by way of example the edge 10 of screen 9 is chosen to be rectilinear, the beam being deflected in one direction. As a matter of course, the edge may exhibit a different shape. Thus, for example, in the case of searchlights used on vehicles, it is frequently already sufficient for avoiding dazzling to remove the light from one of the top angles of the beam, namely from the left-hand top angle in the case of right-hand traffic and from the right-hand top angle in the case of left-hand traffic.

Fig. 5 shows the form of beam of a searchlight in which one of the top angles is removed from the beam, without measures being taken whereby the light of the initial beam is deflected. It is evident that in this case also an appreciable loss of light is involved.

When using the invention the light of the beam is adapted to be deflected as a whole in a direction remote from the intercepted portion, as a result of which a beam of the shape as shown in Fig. 6 is obtained. Consequently, in this case the field at the right-hand side before the vehicle is intensely illuminated.

In a case as this, however, in which the screen has an edge in the shape of an angle, the beam is divided, in an advantageous embodiment, into two components of which at least one is deflected.

In the embodiment shown in Fig. 7 each component is deflected separately so as to form two images 7' and 7" which are shifted with respect to the initial image in directions normal to one another. In this case the whole of the field in front of the vehicle as well as the right-hand side of the road are satisfactorily lighted.

When using searchlights on vessels it is also desirable to remove the part of the flux of the beam of light radiated in the direction of a vessel coming from the opposite side. However, it is furthermore desirable that the light should be deflected to either side of the canal at the left and at the right in front of the vessel. This is possible, as before, by dividing the light of the beam so as to form an image as shown in Fig. 8. In this case, as before, two images 7' and 7" of the light source are formed, whilst the stray-light is also divided into two parts 8' and 8".

In this case it is particularly advantageous if the screen has an edge exhibiting two parallel parts, whilst the device coupled to the screen produces two new real images laterally of these edges, thus dividing the beam into two parts which are deflected in opposite directions at right angles to the parallel edges of the screen.

The searchlight producing this beam may be constructed in the manner as illustrated in Fig. 9. This figure is a horizontal meridian cross-section of the searchlight constructed in a manner analogous to that of the searchlight shown in Figs. 3 and 4, except, however, that screen 9 has two active edges 10' and 10" and that two prisms 15' and 15" are provided. Consequently, two images 3' and 3" of the light source are formed, each of them being located closely at the side of an edge 10', 10" respectively of screen 9. Thus, the dark screen and closely at the side thereof the two bright images of the light source are projected by lens 4 in the infinite, so that a distribution of light ensues as shown in Fig. 8.

If a prism is used to deflect the beam, it is desirable that the prism should be arranged at a place at which all the rays emanating from the light source are greatly concentrated, hence near the image 3 of the light source. Thus, the prism may be of small size and the mechanism operating the prism may be of a light construction. On the other hand it is, of course, necessary that the prism should be remote from the real image 3 to such an extent that the light rays are sufficiently deflected.

What we claim is:

1. Searchlight apparatus, comprising a source of light, an optical system for directing said light in a given direction and producing a given illuminated area comprising a first part and a second part, a light screen member and means for directing the said light from said given direction, said first part of said system producing at least one real image of the said light source in the focal plane of the said second part, said second part forming a beam of the light radiated by the said real image, said light screen member being shiftable relative to the said optical system approximately in the direction of the said focal plane for variably screening the said light and thereby reducing the said illuminated area along one boundary thereof, said directing means coacting simultaneously to direct the said beam at least partly in the direction remote from the said boundary of said illuminated area so that the area of greatest flux intensity is still beamed by the said second part.

2. A searchlight as claimed in claim 1, wherein the directing means comprises a support for the searchlight which is pivoted and a coupling device between the screen and a fixed part of the support.

3. A searchlight as claimed in claim 1, wherein the directing means comprises a prism movable into or out of the light emanating from the light source and a coupling device connecting the prism to the screen, the arrangement being such that upon the edge of the screen being shifted towards the real image of the light source the prism projects a new real image which is shifted in position relatively to the initial image.

4. A searchlight as claimed in claim 1, wherein the screen has a rectilinear edge and wherein the beam is caused to be directed in one direction.

5. A search-light as claimed in claim 1, wherein the screen has two parallel edges and said directing means comprises a dual prism device coupled to the screen member to produce a new real image at each side of the parallel screen edges, thus dividing the beam into two parts which are directed in opposite directions at right angles to the parallel edges of said screen member.

JAN BERGMANS.
DIRK VERMEULEN.

REFERENCES CITED

The following references are of record in the file of this patent:

UNITED STATES PATENTS

| Number | Name | Date |
|---|---|---|
| 1,389,291 | Bone | Aug. 30, 1921 |
| 1,410,077 | Peck | Mar. 21, 1922 |
| 1,480,803 | Bone | Jan. 15, 1924 |
| 1,581,581 | Lewis | Apr. 20, 1926 |
| 1,598,044 | Bone | Aug. 31, 1926 |
| 1,703,494 | Lewis | Feb. 26, 1929 |
| 1,928,431 | Morshead et al. | Sept. 26, 1933 |
| 2,090,062 | Muller | Aug. 17, 1937 |
| 2,285,408 | Blauvelt | June 9, 1942 |

FOREIGN PATENTS

| Number | Country | Date |
|---|---|---|
| 535,057 | Germany | of 1931 |